United States Patent [19]

Smith

[11] Patent Number: 4,559,906
[45] Date of Patent: Dec. 24, 1985

[54] SMALL ANIMAL HARNESS

[75] Inventor: Maurice D. Smith, Dallas, Tex.

[73] Assignee: Dennis W. Whiting, Irving, Tex. ; a part interest

[21] Appl. No.: 602,687

[22] Filed: Apr. 23, 1984

[51] Int. Cl.$^4$ ............................................. A01K 29/00
[52] U.S. Cl. ........................................ 119/96; 119/102
[58] Field of Search ...................... 119/96, 102; 54/71, 54/79

[56] References Cited

U.S. PATENT DOCUMENTS

| 1,015,239 | 1/1912 | Miller | 119/102 |
|---|---|---|---|
| 2,555,027 | 5/1951 | Clayton | 119/96 |
| 2,826,172 | 3/1958 | Buckle et al. | 119/96 |
| 4,036,179 | 7/1977 | Turner et al. | 119/96 |
| 4,091,766 | 5/1978 | Colliard | 119/106 |
| 4,384,548 | 5/1983 | Cohn | 119/96 X |
| 4,411,222 | 10/1983 | Wolfson | 119/96 |

*Primary Examiner*—Robert P. Swiatek
*Attorney, Agent, or Firm*—Kenneth R. Glaser

[57] ABSTRACT

A small animal harness for picking up and carrying about a small animal comprises a main body portion that is adapted to essentially wrap around, or under, the trunk of a small animal. The harness includes straps that fasten together essentially across the back of the small animal, and a front strap that passes across the lower neck/upper chest area of the animal to retain the harness in functional position. A handle is affixed to the strap(s) in the area of the animal's back to enable the animal to be manually picked up and carried about. The handle is rigid so that the lifting forces from the handle to the main body portion are distributed evenly across the entire width of the main body portion in order to provide even support along the lower side of the trunk of the animal. The small animal harness is quickly and easily fitted onto and removed from the animal by the use of buckles, snaps or hook end loop type fasteners on the back straps. The adjustability of the small animal harness permits the harness to be used on various sizes of small dogs and cats.

10 Claims, 2 Drawing Figures

U.S. Patent    Dec. 24, 1985    4,559,906
FIG 1
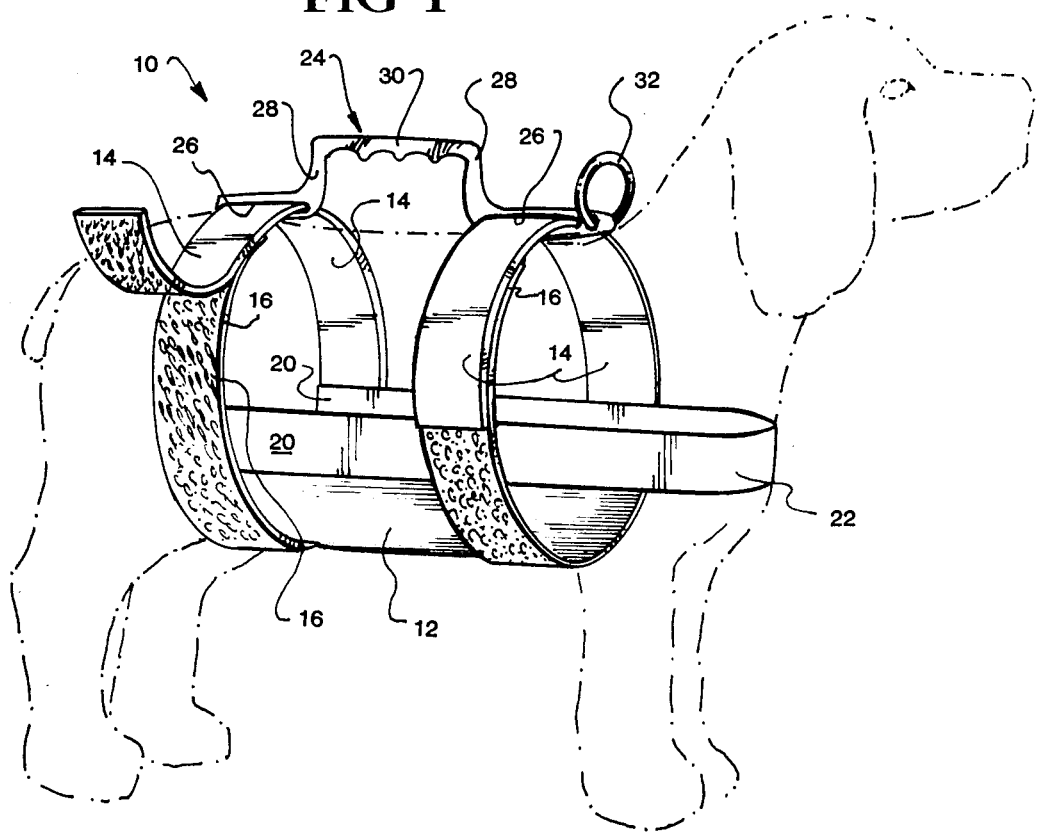
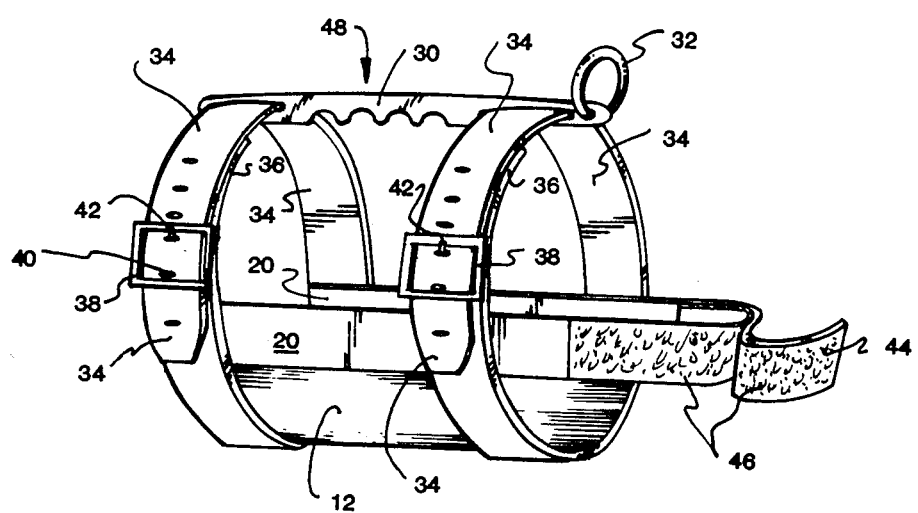
FIG 2

SMALL ANIMAL HARNESS

BACKGROUND OF THE INVENTION

This invention relates to devices for transporting or otherwise carrying small animals about, and more specifically to an apparatus for supporting the trunk of a small animal while the animal is picked up and carried about.

In densely populated sections of major metropolitan areas, high-rise apartment and condominium complexes do not provide lawns or garden areas in which owners of pets (specifically small dogs) may take these small animals on occasional walks outdoors. In order to walk the dog, the owner must take the dog to a nearby park or recreational area, sometimes a few blocks away, frequently crossing vehicular traffic intersections, and occasionally during inclement weather, necessitating that the small animal be carried at least a part of the way to and from the "walking" area. Heretofore, owners of small pets almost invariably soiled their own clothing by picking up the small pet in the conventional manner, (i.e., by grasping the small pet around its trunk and carrying the pet upon the pet owner's bosom or attempting to cradle the pet, feet down, in one arm while holding the pet with the opposite hand) after the pet had walked around the park or other recreational area or otherwise soiled its feet in wet or muddy areas of the walkway.

Accordingly, it has been considered highly desirable to provide a device that enables the pet owner to pick up the pet and carry the pet about conveniently and easily in a manner such that the pet's soiled feet never need come in contact with the pet owner's clothing. More importantly, however, it has been desirable to provide a device which provides even support across the entire underside of the trunk of a small pet while the pet is being transported about, in order to avoid the lifting or carrying force from being concentrated in a number of small contact areas along the pet's underside. It has also been highly desirable to provide a device in which the pet may be comfortably carried about, which device also enables th pet owner to easily restrain the pet from attacking other pets when a number of small animals are in close proximity (i.e., in a veterinary clinic waiting room).

SUMMARY OF THE INVENTION

The present invention provides an apparatus for transporting a small animal and for supporting the trunk of the small animal while the animal is being transported about. The apparatus includes a flexible main body portion which is adapted to be attached around the trunk of the animal for even support thereacross. A rigid handle extending the width of the main body portion is attached thereto in a manner to provide even support across the entire surface area of the body portion. In this manner, the pet can be easily carried about, like a small suitcase, in a position such that the animal's mouth and feet or claws are prohibited from reaching the hand or arm of the person carrying the animal.

BRIEF DESCRIPTION OF THE DRAWINGS

Specific features of the invention, as well as additional objects and advantages thereof, will become more readily understood by reference to the following detailed description taken in conjunction with the accompanying drawings, in which like reference numerals refer to corresponding parts, and in which:

FIG. 1 is a pictorial view of the small animal harness of the present invention showing the harness functionally positioned about a small dog, the dog being shown in phantom;

FIG. 2 is a pictorial view of an alternative embodiment of the small animal harness of the present invention.

DETAILED DESCRIPTION OF THE INVENTION

Turning now to the drawings, and more specifically to FIG. 1, the small animal harness of the present invention is shown generally illustrated by the numeral 10. The small animal harness in this embodiment is shown to comprise a main body portion 12 adapted to be wrapped around the underside of the trunk of the small animal. A pair of straps 14 extend from the main body portion 12 up over the animal's back, and are adapted to attach to a mating pair of straps 16 that are formed with the main body portion on the opposite side (the animal's right side as shown in the figures) and likewise extend partially up onto the back of the animal. In a preferred embodiment, these straps 14 and 16 are formed with a hook end latch fastener material, such as is manufactured by Velcro, Inc., to enable quick and secure attachment of the harness about the small animal.

The main body portion 12 is formed of a canvas or other structural fabric material, and may be reinforced around the periphery thereof by reinforcement members 20, which also aid in maintaining the main body portion in the shape to provide optimum support to the animal. These reinforcement members 20 may be formed of a cloth web or similar material which is flexible yet provides sufficient structural integrity to maintain the shape of the body portion 12.

The body portion 12 also includes a front strap 22 which extends around the front of the animal adjacent the upper chest/lower neck area. This front strap 22 serves to retain the animal harness in functional position about the animal's trunk, and prevent the harness from slipping rearwardly toward the animal's back legs. This front strap 22 may be either a continuous strap, attached to the main body portion 12 at each end thereof, or may be adjustable in the sense that it comprises two free straps having attachment means on the ends thereof (as in hook end latch fasteners) for attaching together snugly around the upper chest area of the animal (see FIG. 2).

The small animal harness 10 of the present invention also includes a rigid handle 24 attached therewith to enable manual grasping of the harness in order to pick up the animal and carry the animal about. In the embodiment shown in FIG. 1, the handle 24 is attached to the pair of straps 14 in a manner to slide therealong and self-adjust to the geometric center of the animal harness, once the harness is in functional position about the animal. In this regard, the handle 24 includes slots 26 in each end thereof of sufficient size to permit the straps 16 to freely pass therethrough to enable automatic centering of the handle about the animal harness and about the center of the animal's back when the animal is picked up by the animal harness handle.

In the preferred embodiment, the handle 24 includes stepped sections 28 at each end thereof which define a handle body portion 30 between the stepped sections. The stepped sections 28 enable the handle body portion 30 to maintain a certain minimum distance from the animal's back in order to permit the pet owner to easily grasp the handle body portion 30 by inserting his fingers under the handle portion between the handle and the animal's back.

The preferred embodiment of the animal harness 10 also includes a hook or ring 32 preferably attached to the rigid handle 24 adjacent the slot 26 thereof. The hook or ring may be used to attach a leash in the conventional manner.

ALTERNATIVE EMBODIMENT

Referring now to FIG. 2, an alternative embodiment of the small animal harness of the present invention is shown. Because a number of the elements of this embodiment are identical to corresponding elements of the preferred embodiment, those elements are given identical reference numerals and will not be further described in detail. The alternative embodiment includes first and second pairs of straps 34, 36, respectively, different from the straps 14, 16 of the preferred embodiment. In this alternative embodiment, the straps 36 are formed with buckle devices 38 which receive therein respective straps 34. Each of the straps 34 has a series of holes 40 therein for receiving tongues 42 of the buckle devices. The buckle devices securely, yet adjustably, fasten the small animal harness about the animal in the manner indicated in FIG. 1.

Although not shown in the drawings, the hook end latch fasteners mechanism or buckle may be replaced with conventional snaps (or preferably, a series of snaps) to securely and adjustably retain the harness in place about the small animal.

The alternative embodiment shown in FIG. 2 incorporates the use of an adjustable front strap 44, comprising two free end straps, each having a fastening device thereon, as in a hook end latch fastener mechanism 46. This permits the harness to be adjusted to fit snugly on any small animal within a specified range of sizes, and also avoids the problem of a fixed-length front strap which could conceivably hang on a foreign object or trap the animal's front legs.

Additionally, the alternative embodiment of the small animal harness incorporates a flat or linear rigid handle 48 in place of the handle 24 of the preferred embodiment. The handle 48 functions in an identical manner to the handle 24 to aid in distributing the retaining force of the main body portion of the harness across the entire surface area thereof. However, the handle 48 in the alternative embodiment does not include the designed space between the handle body portion 30 and the back of the small animal through which the user inserts his fingers in order to grasp the handle. In practice, however, the small animal harness of the present invention is sufficiently loose on the animal that it is a simple matter to insert the fingers between the flat or linear handle 48 and the animal's back in order to grasp the handle to pick the animal up and to carry it about. Therefore, functionally, the two handles 24 and 48 are identical, the only difference being aesthetic, in that the use of the flat or linear handle 48 does not give the small animal and animal harness the appearance of a small suitcase. Additionally, as in the preferred embodiment, the flat or linear handle may also include the hook or ring 32 to which a leash may be attached in the customary manner.

It has been determined through experimentation that typically hyperactive dogs become quite docile while wearing the small animal harness of the present invention. The inventor postulates two theories for this radical change in animal behavior and disposition. First, the harness provides even support across the underside of the animal's trunk, as opposed to the concentrated areas of lifting force on the animal's trunk when the animal is picked up by hand (specifically the two middle fingers of each hand where most, if not all, of the lifting force is concentrated). This even support eliminates pain that otherwise occurs in the concentrated areas of lifting force.

Secondly, the animal realizes that he can easily be controlled by the person holding him, and that it is virtually impossible for the animal to reach around to bite the hand or arm of the person, or to scratch or claw the person's hand or arm. In this manner, the owner may exercise a control over the animal that is not possible with a conventional leash. Therefore, any potential harm to the owner or to other people is virtually eliminated, due to the inherent restraint provided by the small animal harness.

Those skilled in the art will readily appreciate that the overall arrangement of the small animal harness of the present invention is particularly advantageous for use in picking up and transporting small animals about. The small animal harness has particular utility for transporting and maintaining small animals under control within the confines of a veterinary clinic waiting room wherein small animals might otherwise be intimidated or provoked by other larger animals. The small animal harness of the present invention also has particular utility for use in exercising small aminals outdoors, in that, properly positioned upon a small animal, the harness will not interfere with the small animal's normal bodily functions. Although preferred embodiments of the preferred invention have been disclosed in detail herein, it will be understood that various substitutions, modifications may be made to the preferred embodiments without departing from the scope and spirit of the present invention as recited in the appended claims.

What is claimed is:

1. A harness for transporting a small animal, and for supporting the trunk of said animal while it is being transported, said harness comprising:
    a flexible main body portion adapted to wrap around the underside of the trunk of said small animal;
    first and second back straps attached to said main body portion and adapted to wrap around the trunk and over the back of said small animal at forward and rear support positions, respectively;
    attachment means mounted onto said first and second back straps for securing said straps about the trunk of said small animal at the forward and rear support positions, respectively;
    a chest strap connected to said main body portion for passing adjacent the upper chest portion of said small animal to aid in retaining said harness in functional position about said small animal; and,
    a handle having first and second end portions movably coupled to the first and second back straps, respectively, for maintaining said straps in the forward and rear support positions, respectively, while simultaneously permitting said first and second back straps to move relative to said handle to allow centering of said handle about the harness and about the center of the animal's back when the animal and harness are lifted by said handle.

2. A harness as defined in claim 1, said handle first end portion having a slot and said handle second end portion having a slot, said first back strap extending through the slot in the first handle end portion, and said second back strap extending through the slot in the second handle end portion.

3. A harness as defined in claim 1, said handle comprising a material which is relatively stiff and rigid with respect to said flexible main body portion whereby said back straps are maintained substantially in their respective forward and rear support positions as the animal and harness are lifted by said handle.

4. A harness as set forth in claim 1, wherein said attachment means comprises a strap and buckle arrangement.

5. A harness as set forth in claim 1, wherein said attachment means comprises a hook end latch fastener mechanism.

6. A harness as set forth in claim 1, wherein said handle is essentially linear in shape.

7. A harness as set forth in claim 1, wherein said handle is stepped at the ends thereof to facilitate manual grasping of said handle by permitting placement of the fingers between the handle and the back of said small animal.

8. A harness as set forth in claim 1, including a ring coupled to said handle for attaching a leash to said harness.

9. A harness as set forth in claim 1, wherein said chest strap comprises a single continuous strap connected at both ends to said main body portion.

10. A harness as set forth in claim 1, wherein said chest strap comprises two strap pieces adapted to be adjustably attached together across the upper chest portion of said animal.

* * * * *